O. C. WILLIS

DUST BAG FOR SUCTION CLEANING APPARATUS

Oct. 28, 1930. Re. 17,852

Original Filed Aug. 8, 1924 2 Sheets-Sheet 1

INVENTOR:
OLO C. WILLIS
BY N. O. Quarnes
ATTORNEY.

O. C. WILLIS

Oct. 28, 1930. DUST BAG FOR SUCTION CLEANING APPARATUS Re. 17,852

Original Filed Aug. 8, 1924 2 Sheets-Sheet 2

INVENTOR:
OLO C. WILLIS
BY
ATTORNEY.

Reissued Oct. 28, 1930

Re. 17,852

UNITED STATES PATENT OFFICE

OLO C. WILLIS, OF LAKEWOOD, OHIO, ASSIGNOR TO THE P. A. GEIER COMPANY, OF CLEVELAND, OHIO, A CORPORATION OF OHIO

DUST BAG FOR SUCTION CLEANING APPARATUS

Original No. 1,753,458, dated April 8, 1930, Serial No. 730,837, filed August 8, 1924, and in Canada August 31, 1923. Application for reissue filed July 31, 1930. Serial No. 472,093.

My invention relates to improvements in dust bags for suction cleaning apparatus, and has for its object the provision of an appliance which shall be more readily employed and emptied of its contents than are those now commonly in use. My improvements relate more particularly to the provision of an expansible and collapsible frame in association with the mouth of a fabric dust bag, said frame being adopted, either for fully opening the mouth of the dust bag, or for closing and sealing the mouth of the dust bag against the escape of dust and débris.

My invention will be explained as applied to the portable type of electrically actuated suction cleaners, comprising its principal adaptation. In this class of suction cleaners, the dust bag almost universally is attached at its lower end to the outlet from the electric fan and is maintained in an inclined position by connecting it from its upper end to the handle of the suction cleaner. Naturally, the dust and débris collected by said suction cleaner, normally accumulates in the lower portion of the dust bag and common practice affords different modes of removing the collected dirt from the lower end of the bag, although this by no means is followed universally.

Owing to the diverse character of the dirt and litter collected by a suction cleaner, varying from the lightest dust to fibrous material and small metallic objects, there is presented something of a problem in freeing the average dust bag of its contents without getting the dirt upon the person or about the room. This disadvantage is especially manifest with respect to dust bags having their discharge openings at or near their lower ends, and I have further observed that a dust bag affording a constricted portion adjacent to the discharge opening or any obstruction by way of seams or pouch-like sections is much more difficult to clear of its contents.

Thus the sanitary emptying of a dust receptacle, particularly as a portion of its contents is likely to cling to the sides of the bag, in addition to lodging against and within proruding edges of seams and the like, involves the most careful design and construction of the dust receptacle. Accordingly, I have sought to improve upon the dust receptacle construction of the prior art by affording a readily closed and opened mouth at the upper end of a dust receptacle and by shaping the same so that its open mouth shall present substantially its greatest opening toward which the fabric sides of the same outwardly taper.

Moreover, I have obviated the difficulty present in all prior dust bags of this class with which I am acquainted, presented by their tendency to collapse at or about the mouth thereof.

For these purposes I have provided a dust bag or receptacle whose mouth is provided with a rectangular hinged preferably metallic frame that is adapted to collapse along two opposite sides when the mouth of the bag is closed, so as to permit a clip to be applied over the members of said frame and the edges of the mouth of the dust bag enclosing the frame. This frame will open upon removal of the clip for the purpose of discharging the dirt, thereby presenting a substantially square mouth opening at the upper end of the dust bag through which the contents may readily be removed.

Further features of my improvement may be more readily explained by making reference to the accompanying drawings, wherein.

Throughout the several figures of the drawings, I have employed the same character of reference to indicate similar parts.

Figures 1, 7:
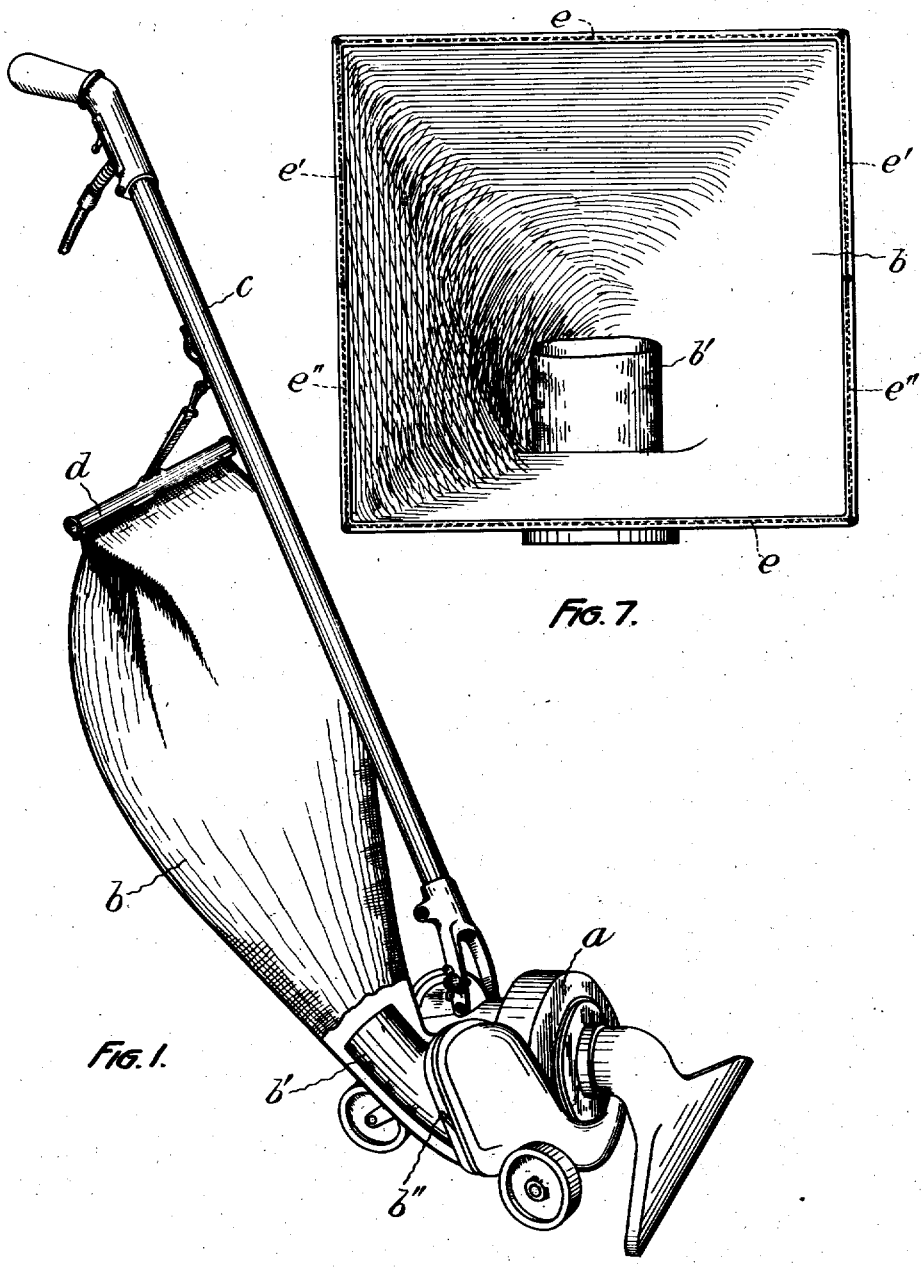
Figure 1, is a perspective view of a suction cleaning appliance equipped with my present improvements.
Fig. 7, is a plan view of the top of the bag upon a slightly reduced scale, showing the open mouth thereof presented by opening the frame.
Figure 2:
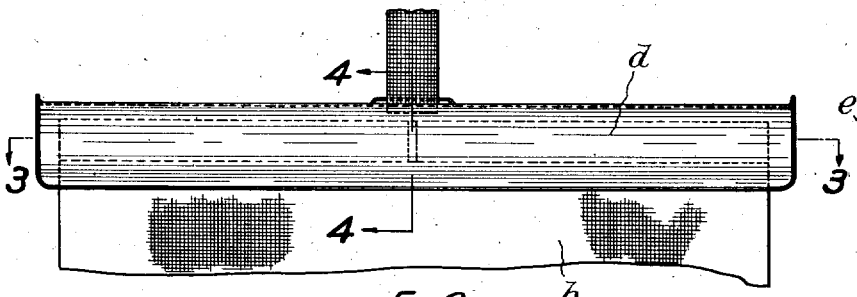
Fig. 2, is a fragmentary view, upon an enlarged scale, of the upper end of the dust bag held within its sealing clip.

Referring first to Figure 1, *a* designates the fan chamber of a portable electric suction cleaner; *b* the dust bag or fabric receptacle or container for the débris therefrom and *c* the handle, between which and the fan chamber said dust bag normally is supported, as shown.

The details of the upper end of the dust bag and the closure means therefor are well illustrated in Figs. 2, 3, 4, 5 and 6, of the drawings, wherein the spring clip *d* is shown firmly grasping the walls of the bag below its mouth to prevent the escape of the dust laden air, while affording sufficient space throughout its body for accommodating the frame enclosed and stitched within the body of the fabric mouth of the bag.

Figure 5:
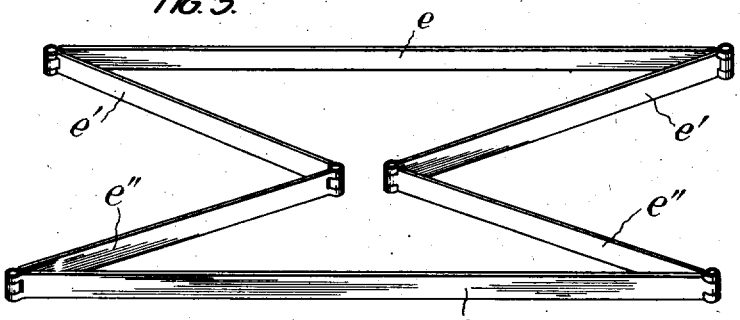
Fig. 5, is a perspective view of a hinged metallic frame.
Figure 6:
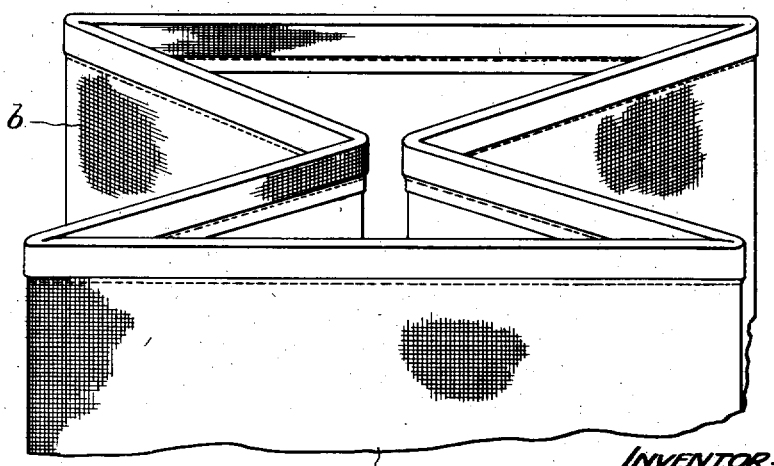
Fig. 6, is a fragmentary perspective view of the upper end of the bag partially opened.

This frame is best shown in Fig. 5 and comprises two side sections or principal members *e*, between which are hinged the collapsible end sections or members *e'*, *e''*, which members form the stays for the fully open mouth of the bag as shown in Fig. 7. These members are stitched within a hem of the fabric which completely encloses the frame and takes its shape therefrom.

Figure 4:
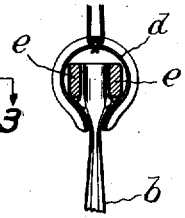
Fig. 4, is a transverse section on line 4—4, Fig. 2.
Figure 3:
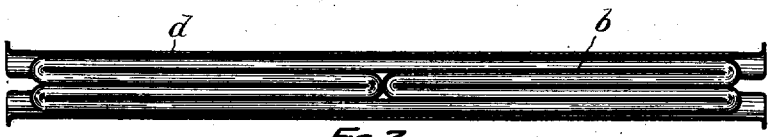
Fig. 3, is a longitudinal section thereof on line 3—3, Fig. 2.

The members *e*, *e'* and *e''* of the frame have sufficient body and thickness, as shown in Fig. 4, to cause their fabric faces, presented by the hem of fabric stitched around and enclosing the members, to be engaged, when the collapsible members *e'*, *e''* are folded within the compass of the opposing principal members *e*, so as to effectively seal the mouth of the bag in approximately air tight relation, as shown in Fig. 3, when the spring clip *d* is in the position shown in Figs. 1, 2, 3 and 4.

Moreover, the body and thickness of the frame members prevent the clip *d* from being removed from its sealing position on the thickened mouth of the bag in any manner except by sliding the clip longitudinally of the frame forming the thickened mouth of the bag, and prevent the clip from pulling out laterally of the collapsible frame.

And finally, the frame stiffens and reinforces the mouth of the bag so that when the mouth of the bag is in the collapsed position shown in Fig. 3, the clip *d* may be readily and easily assembled in position around the thickened mouth to cause the fabric faces of the frame to be engaged for sealing the mouth of the bag.

It will be appreciated that the dust bag, normally sealed below the level of the frame, may readily be opened at its mouth merely by sliding the clip longitudinally of the frame members and laterally from its sealing position and throwing the members *e'*, *e''* of the frame, into their expanded parallel relation. This forms a square opening for the mouth of the dust bag which is capable of collapsing for the purpose of effecting a seal having a relatively short length equal to a side of the square opening.

Referring to the broken-away portion of the dust bag, Fig. 1, it will be seen that a tubular member *b'* of fabric forming a sleeve-like trap, is provided at the inlet of the dust bag to afford an automatic seal against the exit of dust and débris at this point. This sleeve will collapse excepting when air pressure is applied to drive the dust-laden currents into the bag, as will be readily understood.

In order to empty the bag of its contents when the mouth has been opened, as shown in Fig. 7, a newspaper may be laid upon the ground or floor and the opened mouth of the dust bag as defined by its frame is pressed thereon. The smaller end of the dust bag is then elevated, either by lifting the attached suction cleaner, if desired, or by detaching the locking lugs *b''* and removing the smaller end of said dust bag from the suction cleaner, whereupon the bulk of the dust will fall upon the paper and by lightly tapping the sides of the bag, such dust as adheres thereto will be disengaged and also fall upon the paper, to be readily disposed of in any suitable way.

It will be appreciated that this form of dust receptacle does not afford any places of lodgment for dirt, that the largest portion of the bag is presented at its opened mouth or discharge portion, and that the mouth may be closely pressed down upon the paper or other discharge surface to permit removal of the bag contents and to prevent dispersion of the contained dust, germs, and litter collected from time to time by the suction cleaner.

Having now described with some detail the preferred embodiment of my invention, I claim as new and desire to secure by Letters Patent, together with such modifications as may be made therein by mere skill, the following:—

1. Closure means for dust receptacles, comprising a fabric container having an open mouth and a frame within said mouth further comprising hinged collapsible metallic members folded within the compass of two opposing principal members of said frame, said members being enclosed within the body of the fabric mouth, and means for sealing the mouth in approximately air tight relation when the frame is collapsed.

2. Closure means for dust receptacles and the like, comprising a frame formed from hinged collapsible members folding within the compass of two opposing principal members of said frame, fabric engaging faces provided for the collapsible members of the frame, and means for sealing the frame members in approximately air tight relation when the members are in their collapsed relation.

3. Closure means for dust receptacles, comprising a fabric container having an open mouth and a frame within said mouth further comprising collapsible members hinged to and folded within the compass of two opposing principal members of said frame, said members being enclosed within the body of the fabric mouth, and means for sealing the mouth in approximately air tight relation when the frame is collapsed.

4. Closure means for dust receptacles, comprising a collapsible frame formed from collapsible members hinged to and folded within the compass of two opposing principal members of said frame, fabric material enclosing said frame members providing fabric faces for the same, and means for engaging certain of said fabric faces in approximately air tight sealing relation when the frame is in collapsed position.

5. Closure means for dust receptacles, comprising a collapsible frame formed from collapsible members hinged to and folded within the compass of two opposing principal members of said frame, fabric engaging faces provided for the frame members, a clip extending longitudinally of the collapsible frame for sealing the fabric faced frame members in approximately air tight relation, and the frame members having sufficient body, thickness, and stiffness to permit the clip to be readily assembled in sealing position longitudinally of the collapsible frame and to prevent the clip from pulling out laterally of the collapsible frame.

OLO C. WILLIS.